United States Patent
Cheng

(10) Patent No.: US 7,269,039 B2
(45) Date of Patent: Sep. 11, 2007

(54) METHOD AND DEVICE FOR PRODUCING RECTIFIER GATING SIGNALS USING FEED FORWARD CONTROL

(75) Inventor: Louis Cheng, Ontario (CA)

(73) Assignee: Honeywell International Inc., Morris Township, NJ (US)

( * ) Notice: Subject to any disclaimer, the term of this patent is extended or adjusted under 35 U.S.C. 154(b) by 47 days.

(21) Appl. No.: 11/206,734

(22) Filed: Aug. 19, 2005

(65) Prior Publication Data

US 2007/0041229 A1    Feb. 22, 2007

(51) Int. Cl.
H02M 1/42    (2006.01)
H02M 7/155    (2006.01)

(52) U.S. Cl. .............................. 363/81; 363/85; 363/89

(58) Field of Classification Search ................. 363/39, 363/44, 89, 125, 127
See application file for complete search history.

(56) References Cited

U.S. PATENT DOCUMENTS

| | | | |
|---|---|---|---|
| 4,729,082 A * | 3/1988 | Sato .............................. | 363/41 |
| 4,780,802 A * | 10/1988 | Miyashita et al. ............ | 363/37 |
| 5,852,667 A | 12/1998 | Pan et al. | |
| 5,854,547 A * | 12/1998 | Nakazawa .................. | 318/716 |
| 5,923,214 A | 7/1999 | Mitzlaff | |
| 6,144,255 A | 11/2000 | Patel et al. | |
| 6,489,844 B2 | 12/2002 | Yamashita et al. | |
| 6,750,706 B2 | 6/2004 | Ishida et al. | |
| 2004/0005001 A1 | 1/2004 | Jones et al. | |

FOREIGN PATENT DOCUMENTS

JP    61-164307    7/1986

* cited by examiner

*Primary Examiner*—Gary L Laxton
(74) *Attorney, Agent, or Firm*—Birch, Stewart, Kolasch & Birch, LLP

(57) ABSTRACT

A device includes an active rectifier (14) having control gates controllable to produce an output voltage on a DC bus (20), a gate control circuit (16) for producing gate control signals for controlling the active rectifier control gates, a first circuit (18) connected to the gate control circuit (16) for producing a command current magnitude signal and a power factor signal for use by the gate control circuit (16), a current line (30) providing a signal related to the DC load current to the first circuit (18), and a voltage line (32) providing a signal related to the DC bus voltage to the first circuit (18). The first circuit (18) includes a command current magnitude signal generator (34) producing the command current signal based on the DC load current and a power factor controller (44, 48) producing the power factor signal. The power factor controller (44, 48) includes a feed forward circuit (52, 56) for increasing the power factor signal in response to current fluctuations on the current line (30). Also a method of controlling a voltage on a DC bus with the device.

12 Claims, 6 Drawing Sheets

METHOD AND DEVICE FOR PRODUCING RECTIFIER GATING SIGNALS USING FEED FORWARD CONTROL

STATEMENT OF GOVERNMENT INTEREST

This invention was made with Government support under Contract No. N00019-02-3002 awarded by Department of the Navy. The Government may have certain rights in this invention.

FIELD OF THE INVENTION

The present invention is directed toward a method and device for providing a current command signal to an active rectifier producing an output on a DC bus, and, more specifically, toward a method and device for providing a current command signal to an active rectifier that regulates bus voltage based on measurements of bus current in the presence of current fluctuations on the DC bus.

BACKGROUND OF THE INVENTION

Active rectifiers produce DC power having desired current and voltage characteristics from an AC source. It is known to circulate a variable current proportional to a load current on the DC bus to the active rectifier and to control voltage on the DC bus by adjusting a power factor input to the active rectifier as the DC load current varies. However, it is has been found that certain types of equipment, such as a switched reluctance machine for starting a main aircraft engine, can produce a large amount of current harmonics and may cause oscillations on the DC bus. Known controllers cannot adequately control DC bus voltage in the presence of such current fluctuations unless the level of recirculating current is increased significantly. Such an increase in recirculating current will lead to higher power losses and require a larger, heavier device. Increasing the power output and weight of the device is particularly undesirable in the aircraft systems where such switched reluctance machines may be found, especially in view of the fact that these current ocillations are generally transient in nature. It is especially undesirable to provide a heavier, more costly system merely to address such transient conditions.

SUMMARY OF THE INVENTION

These problems and others are addressed by the present invention which comprises, in a first embodiment, a method of controlling a voltage on a DC bus that involves providing an active rectifier having a DC bus voltage input and a DC bus current input, providing a first signal related to the DC bus voltage to the DC bus voltage input, providing a second signal related to the DC bus current to the DC bus current input, sending a current command to the active rectifier based on the first and second signals, and varying a power factor signal sent to the active rectifier for controlling the voltage on the bus, wherein the power factor signal comprises a feed forward component based on the DC bus current.

An additional aspect of the invention comprises a device that includes an active rectifier having control gates controllable to produce an output voltage on a DC bus, a gate control circuit for producing gate control signals for controlling the active rectifier control gates, a first circuit connected to the gate control circuit for producing a command current magnitude signal and a power factor signal for use by the gate control circuit, a current line providing a signal related to the DC load current to the first circuit, and a voltage line providing a signal related to the DC bus voltage to the first circuit. The first circuit includes a command current magnitude signal generator producing the command current signal based on the DC load current and a power factor controller producing the power factor signal, the power factor controller including a feed forward circuit for increasing the power factor signal in response to current fluctuations on the current line.

An additional aspect of the invention comprises a device that includes an active rectifier having control gates controllable to produce an output voltage on a DC bus, a gate control circuit for producing gate control signals for controlling the active rectifier control gates, a first circuit connected to the gate control circuit and producing a command current magnitude signal and a power factor signal for use by the gate control circuit, a current line providing a signal related to the DC load current to the first circuit and a voltage line providing a signal related to the DC bus voltage to the first circuit. The first circuit includes a peak detector detecting current peaks on the DC bus, a command current magnitude signal generator commanding a current as a function of the detected peaks, and a power factor controller varying the power factor signal to control the voltage on the DC bus. The power factor controller includes a feed forward circuit for increasing the power factor signal in response to current fluctuations on the current line.

BRIEF DESCRIPTION OF THE DRAWINGS

These and other aspects and features of the invention will become apparent from a reading of the following detailed description in conjunction with the following drawings wherein.

DETAILED DESCRIPTION

Figure 1:
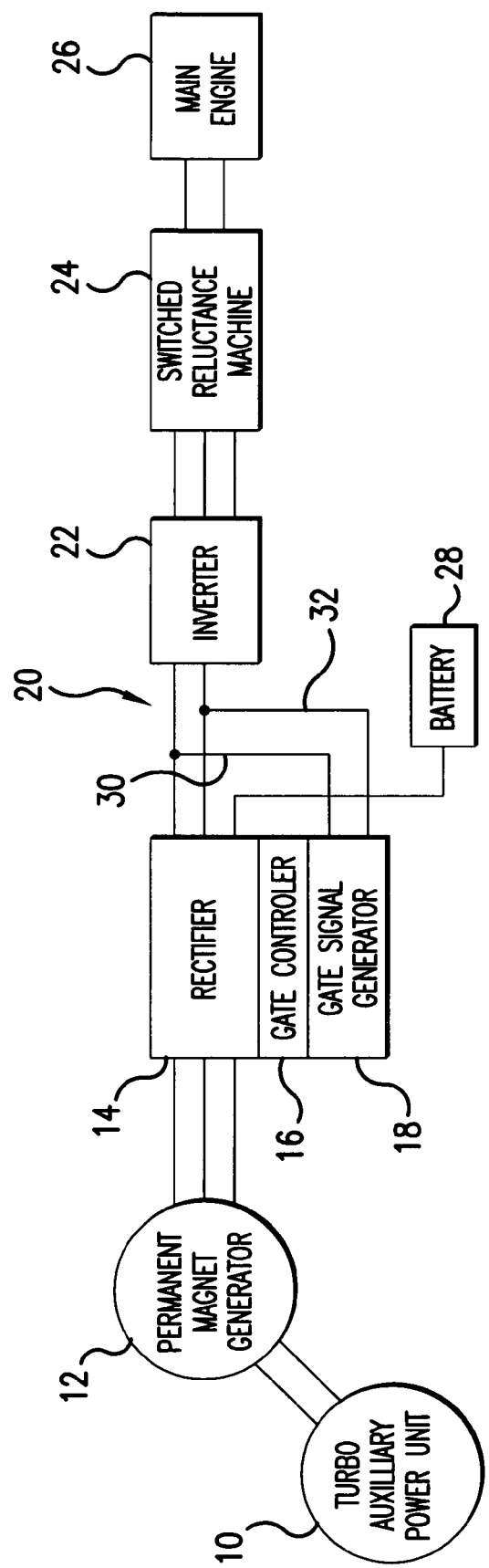
FIG. 1 schematically illustrates a portion of an aircraft power system that includes a rectifier having a gate controller and gate signal generator providing power to a DC bus.

Referring now to the drawings, wherein the showings are for the purpose of illustrating preferred embodiments of the invention only, and not for the purpose of limiting same, FIG. 1 illustrates a portion of an aircraft engine starting system that includes a turbo auxiliary power unit 10, a permanent magnet generator 12, an active rectifier 14 including a gate controller 16 and a gate signal generator 18, a DC bus 20 connected to the output of rectifier 14, an inverter 22 on the DC bus 20, a switched reluctance machine 24 receiving an AC output from inverter 22, an aircraft main engine 26 and a battery 28. Current input line 30 connects DC bus 20 to gate signal generator 18; voltage input line 32 connects DC bus 20 to gate signal generator 18. At engine startup, battery 28 provides a power to permanent magnet generator 12 which starts turbo auxiliary power unit 10. When turbo auxiliary power unit 10 is operational, it drives permanent magnet generator 12 which provides three-phase AC power to rectifier 14. Rectifier 14 is controlled by gate signal generator 18 and gate controller 16 to produce DC power on DC bus 20. Inverter 22 provides AC power to switched reluctance machine 24 which provides power to start main engine 26.

Figure 2:
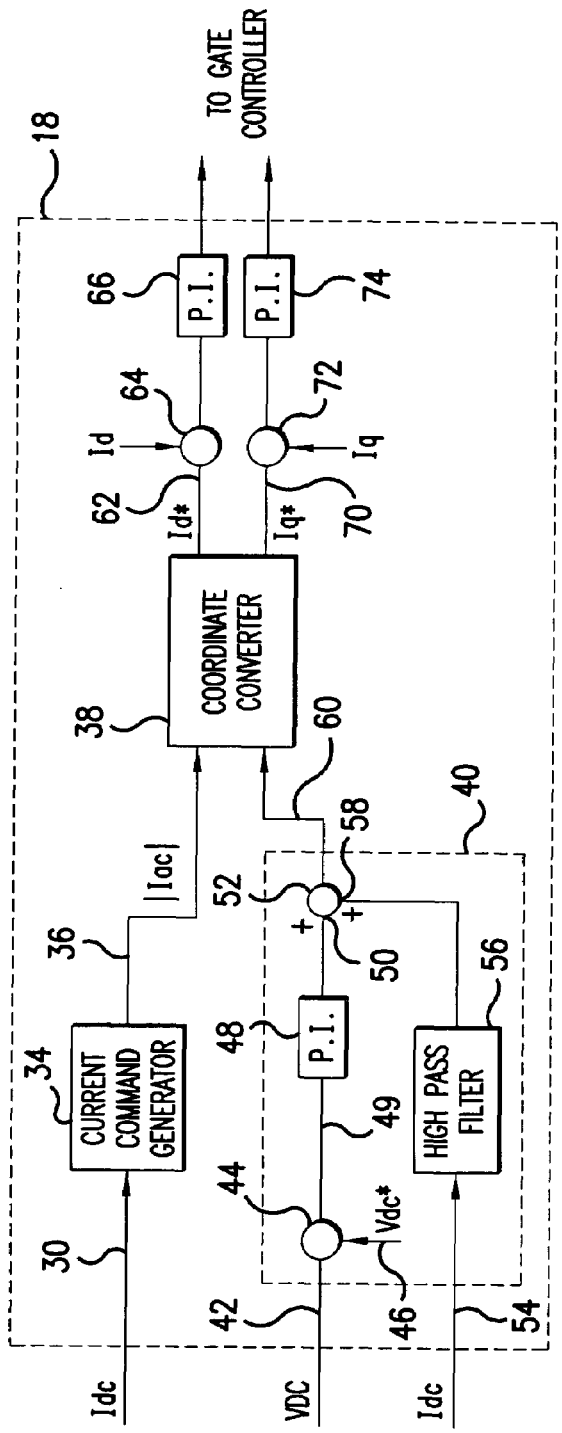
FIG. 2 schematically illustrates the gate signal generator of FIG. 1 receiving a signal related to bus current, a signal related to bus voltage and a bus voltage command as inputs and providing as outputs real and imaginary current signals for use by the gate controller.

FIG. 2 illustrates gate signal generator 18 in greater detail. Gate signal generator 18 includes a command current generator 34 receiving as input the current Idc on DC bus 20 via current input line 30 and produces a command current signal on line 36. Command current signal, conventionally, has been equal to Idc multiplied by a constant on the order of, for example, 1.6, and this approach is provides adequate results in situations where current oscillations are not produced on the DC bus. Line 36 provides the command current signal to a coordinate converter 38.

Gate signal generator 18 also include power factor signal generator 40 which receives a signal related to voltage on the DC bus on a line 42 at a comparator 44 where the DC bus voltage is compared to a reference voltage on line 46. The difference between the signals on lines 42 and 46 is supplied to a proportional integral (PI) control loop 48 on line 49, and the output of control loop 48 is supplied to a first input 50 of a summer 52. A signal representing the current on DC bus 20 is provided to power factor signal generator 40 via line 54 to high pass filter 56 and the output of high pass filter 56 is provided to second input 58 of summer 52. The high pass filter removes the low frequency harmonics, in which the conventional controls can react to this disturbances. The feedforward path is used to improve the frequency response at the higher frequencies. The output of summer 52 comprises a power factor signal that is output to coordinate converter 38 on line 60.

Based on the input command current on line 36 and power factor signal on line 60, coordinate converter 38 produces an output command for real current ($I_d^*$) on line 62 and this command compared with the actual real current at comparator 64 and the difference is passed through a PI control loop 66 to gate controller 16. Coordinate converter 38 also produces an output command for imaginary current ($I_q^*$) on line 70 which is compared with the actual value for imaginary current at comparator 72 and the difference is passed through a PI control loop 74 to gate controller 16. Gate controller 16 controls the rectifier gates in order to produce power on DC bus 20 having the commanded current and phase angle as the sensed voltage and current on the DC bus 20 vary.

Figure 3:
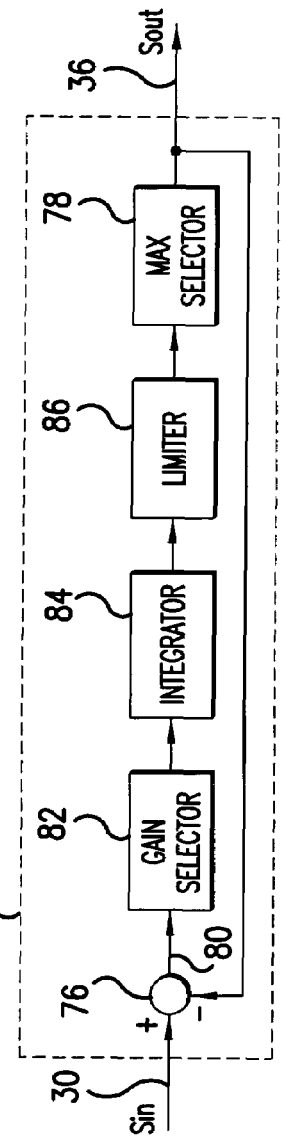
FIG. 3 is a block diagram illustrating an embodiment of the current command generator of FIG. 2.

Command current generator 34 is illustrated schematically in FIG. 3. While command current generator 34 could be realized with hardware, it is presently preferred that the command current signal on line 36 be generated using software control. Command current generator 34 comprises a comparator 76 into which the current $I_{dc}$ on the DC bus is input which current is compared with the output of a max selector circuit 78. The difference between these inputs is provided on a line 80 to a gain selector 82 which applies a first gain to the signal on line 80 when the output of comparator 72 is positive and a second gain to the signal on line 80 when the output of comparator 76 is negative. The output of gain selector circuit 82 is integrated by integrator 84, passed through a limiter 86 and compared at max selector circuit 78 with the signal input on line 30, the actual current on DC bus 20, and the larger of the inputs to the max selector 78 is output on line 36 as the commanded current.

Figure 4:
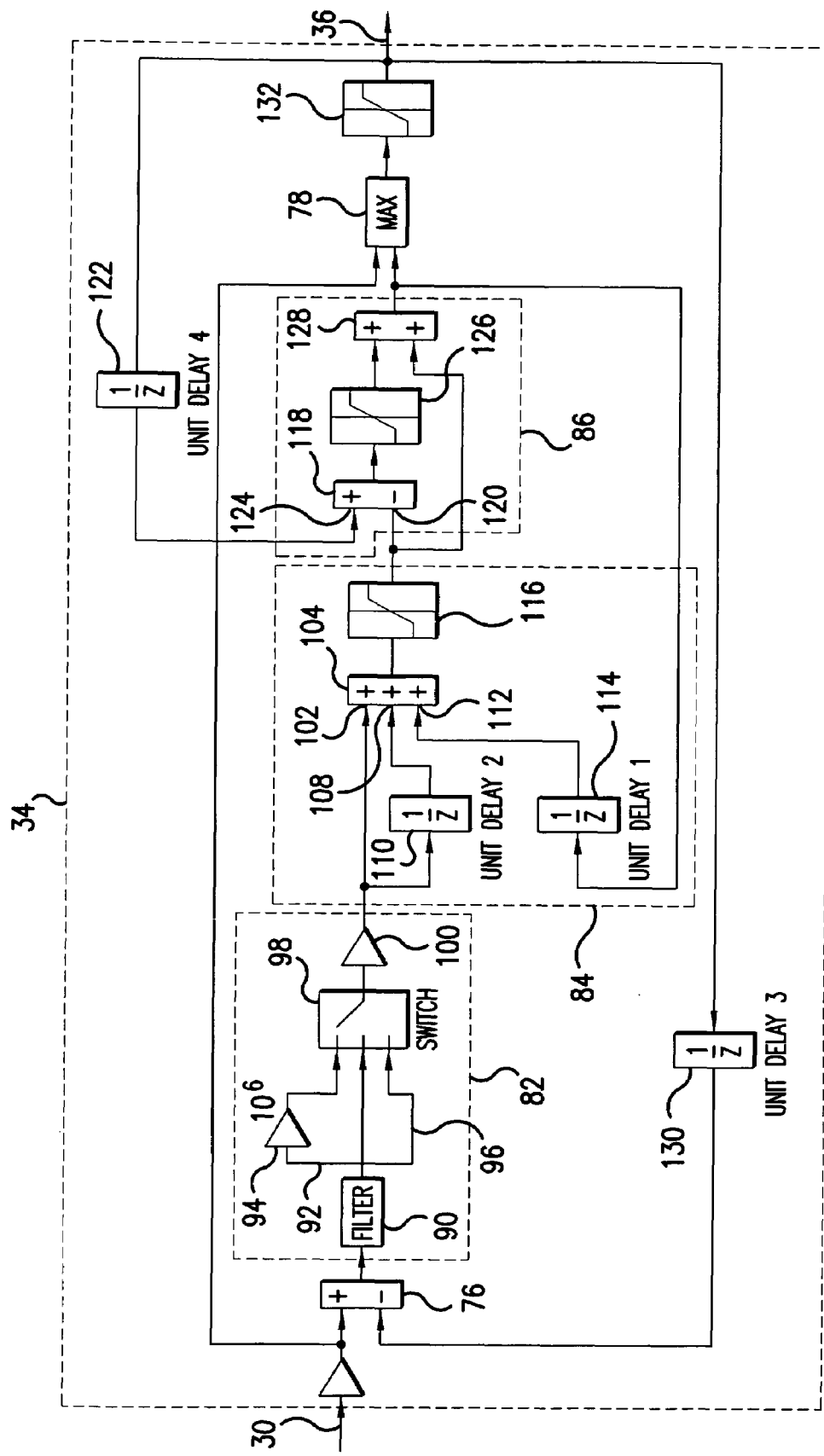
FIG. 4 illustrates the current command generator of FIG. 3 in further detail.

Referring now to FIG. 4, an embodiment of current command generator 34, which includes comparator 76, gain selector 82, integrator 84 and limiter 86 of FIG. 3 is illustrated in detail. Specifically, gain selector 82 includes a deadband filter 90 for removing noise from the incoming signal, a first high gain pathway 92 including an amplifier 94 with a gain of, for example, one million, and a second pathway 96 having a gain of 1. Switch 98 determines which of the first and second pathways is connected to amplifier 100 and output to integrator 84.

The output from amplifier 100 is sent to integrator 84, specifically to the first input 102 of a three input summer 104. The second input 108 of the summer 104 receives the same signal input to first input 106 after this signal has passed through unit delay 110. The third input 112 of summer 104 is the signal output from command current generator 34 delayed by unit delay 114. The sum of these values is integrated by integrator 116 and output to limiter 86.

Limiter 86 includes a differential amplifier 118 that receives the output of integrator 84 at its inverting input 120 and the signal output from command current generator 34, delayed by unit delay 122, at non-inverting input 124. The difference between these signals is integrated by integrator 126 and input to one input of a two-input summer 128, the second input of summer 128 receiving the output of integrator 84 directly. The output of summer 128 is output from limiter 86 and input both to maximum selector 78 and, via a unit delay 130, to the inverting input of differential amplifier 76. The second input of maximum detector 78 receives the signal from line 30 input to command current generator 34 and outputs the larger of these values to integrator 132, the output of which is output as the commanded current.

Figure 5:
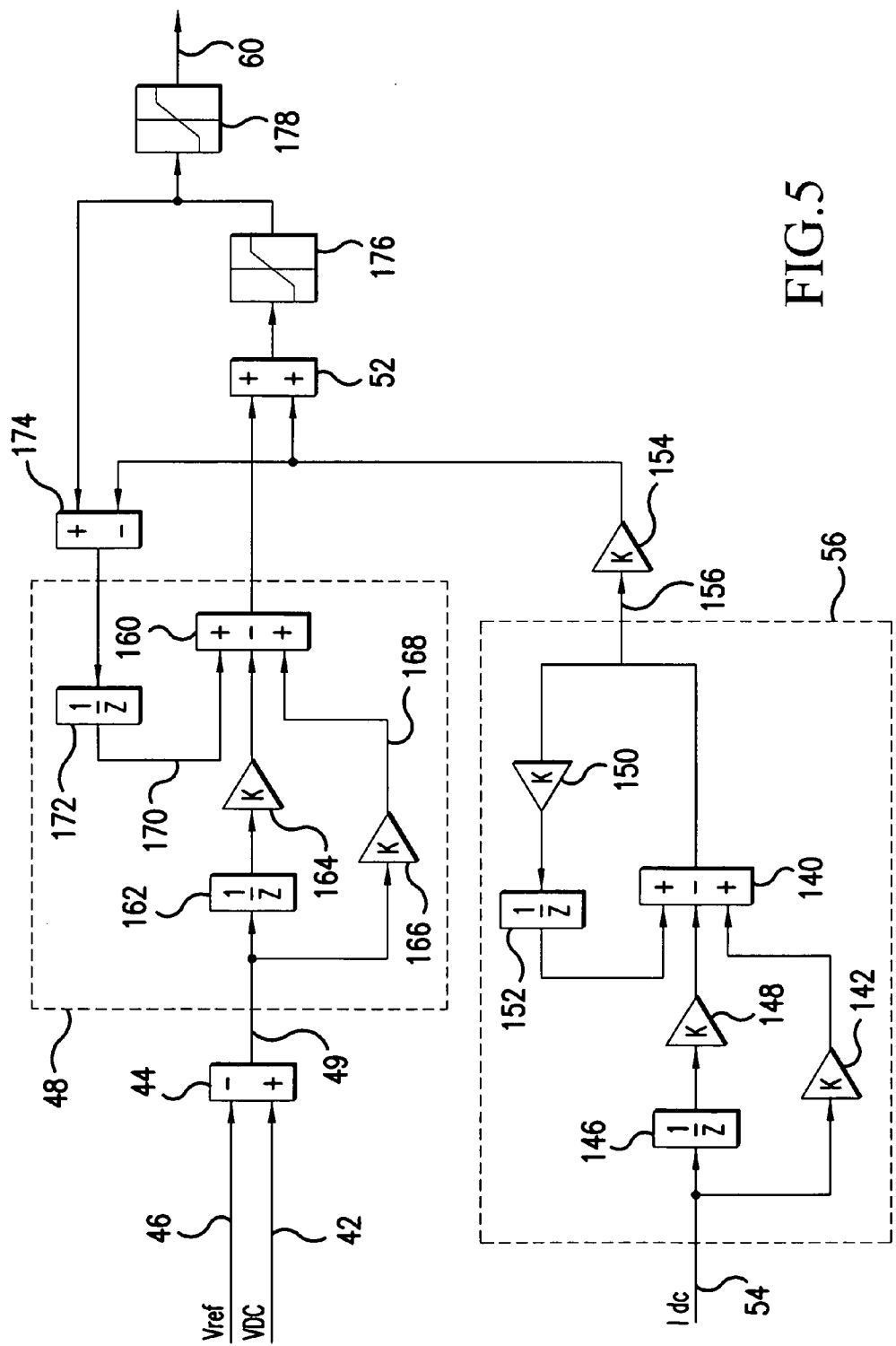
FIG. 5 illustrates the power factor signal generator of FIG. 2.

Power factor signal generator 40, including proportional integral control loop 48 and high pass filter 56 is illustrated in greater detail in FIG. 5. High pass filter 56 receives a signal related to the current on DC bus 20 via line 54 and includes a three input summer 140. The signal on line 54 is provided to a first input of summer 140 via an amplifier 142 on line 144 and to the inverting input of summer 140 via unit delay 146 and a second amplifier 148. The output of summer 140 is provided to the third input of summer 140 via amplifier 150 and unit delay 152. The output of PI control loop 56 is also output via amplifier 154 on line 156.

PI control loop 48 includes a three input summer 160. The signal on line 49 passes through unit delay 162 to amplifier 164 where the signal is amplified by a constant k. The output of amplifier 164 is provided to an inverting input of summer 160. The signal on line 49 is also provided to a second input on summer 160 via an amplifier 166 on line 168. The third input to summer 160 arrives via line 170 through a unit delay 172 from differential amplifier 174. The output of amplifier 154 on line 157 is input to the inverting input of differential amplifier 174 and to summer 52. The output of summer 160 is also provided to summer 52. The output of summer 52 is provided to integrator 176, and the output of integrator 176 is provided to a further integrator 178 and to the second input of differential amplifier 174. The output of integrator 178 is provided to coordinate converter 38 on line 60.

Figure 6:
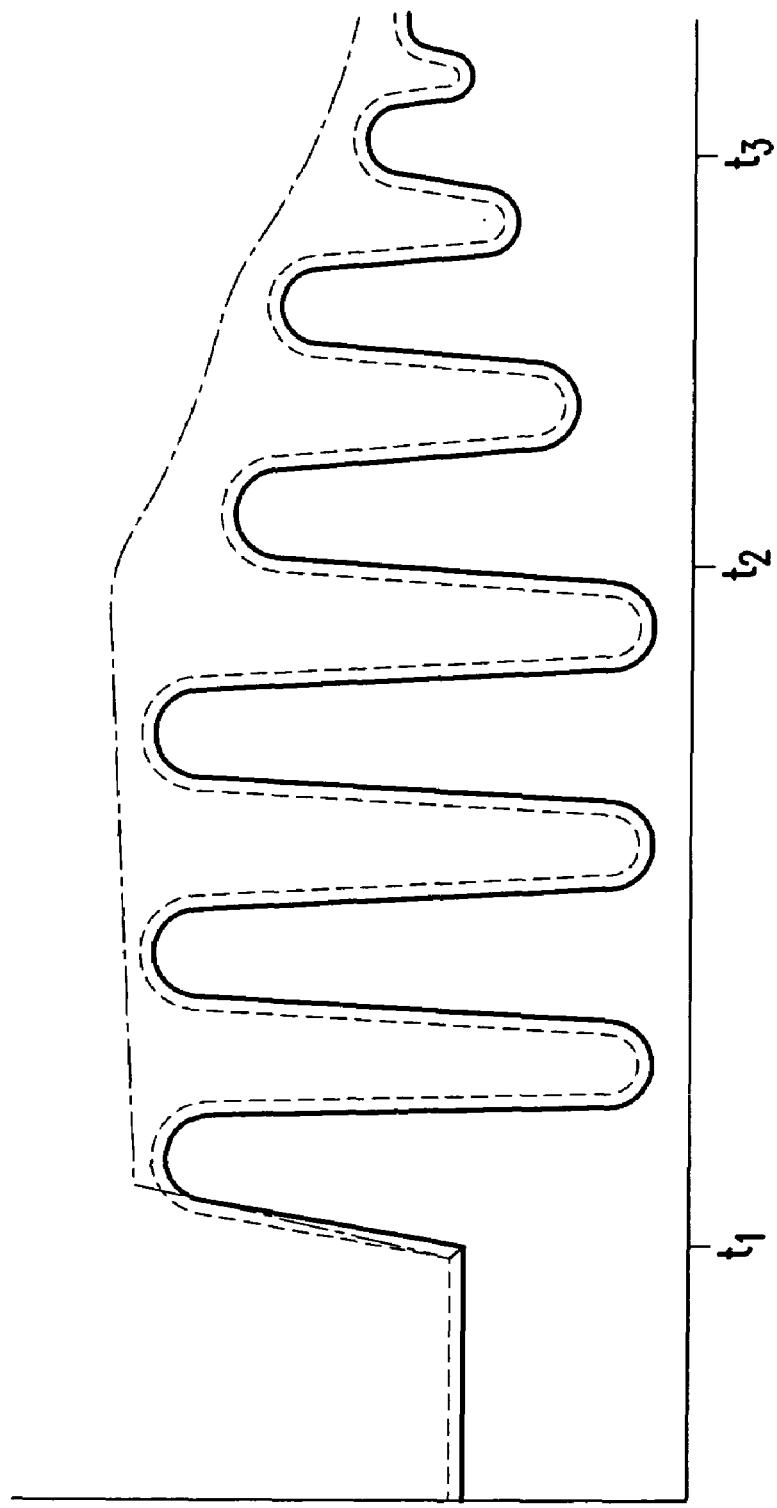
FIG. 6 is a graph illustrating a simulated current command produced by the gate signal generator of FIG. 2 as current on the DC bus fluctuates.

FIG. 6 illustrates an oscillating DC current and simulated command currents produced by gate signal generator 18 and by a conventional gate signal generator. Line 180 in FIG. 6 illustrates a varying bus current. Line 182 illustrates a simulated signal produced by a conventional gate signal generator which attempts to maintain the command current at a given multiple of the detected current. Line 184 illustrates that, using the current command generator and power factor signal generator of an embodiment of the present invention, the command current will rapidly rise to a substantially constant level and only decrease when the peaks of the oscillating current on the DC bus begin to decrease.

Figure 7:
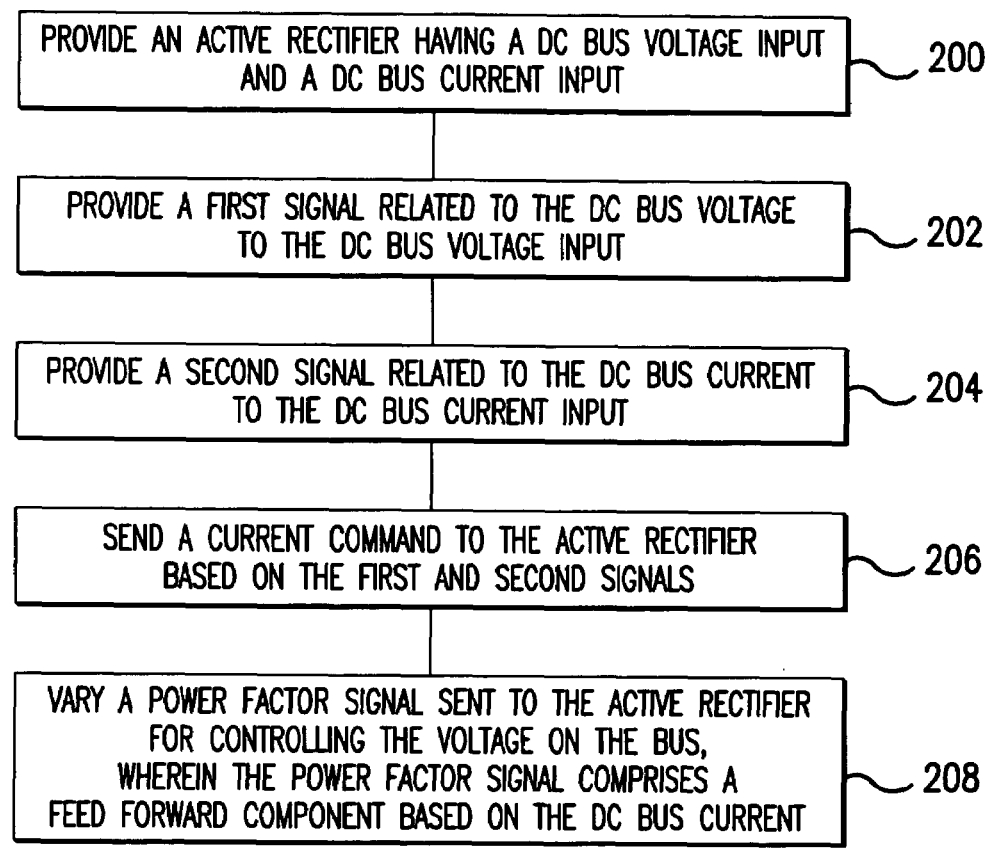
FIG. 7 is a flow chart illustrating a method according to an embodiment of the present invention.

A method of operating a system according to an embodiment of the present invention is illustrated in FIG. 7, which method includes providing an active rectifier having a dc bus voltage input and a dc bus current input at a step 200, providing a first signal related to the DC bus voltage to the DC bus voltage input at a step 202, providing a second signal related to the DC bus current to the DC bus current input at a step 204, sending a current command to the active rectifier based on said first and second signals at a step 206 and varying a power factor signal sent to the active rectifier for controlling the voltage on the bus, wherein said power factor signal comprises a feed forward component based on the DC bus current at a step 208.

The present invention has been described herein in terms of various embodiments. Modifications and additions to these embodiments will become apparent to those of ordinary skill in the art upon a reading of the foregoing description. It is intended that the present application include all such obvious additions and modifications that fall within the scope of the several claims appended hereto.

I claim:

1. A method of controlling a voltage on a DC bus comprising the steps of:
   providing an active rectifier having a DC bus voltage input and a DC bus current input;
   providing a first signal related to the DC bus voltage to the DC bus voltage input;
   providing a second signal related to the DC bus current to the DC bus current input;
   modifying the first signal to produce a third signal;
   modifying the second signal to produce a fourth signal;
   adding the third signal to the fourth signal;
   sending a current command to the active rectifier based on said first signal; and
   sending a power factor signal to the active rectifier for controlling the voltage on the bus, wherein said power factor signal comprises the sum of the third and fourth signals.

2. The method of claim 1 wherein said fourth signal comprises a filtered signal related to the DC bus current.

3. The method of claim 1 including the additional step of setting the third signal to be the difference between the first signal and a reference voltage.

4. The method of claim 3 wherein said reference voltage varies independently of said fourth signal.

5. A device comprising:
   an active rectifier having control gates controllable to produce an output voltage on a DC bus;
   a gate control circuit for producing gate control signals for controlling the active rectifier control gates;
   a first circuit connected to the gate control circuit for producing a command current magnitude signal and a power factor signal for controlling the gate control circuit;
   a current line providing a first current signal related to a DC load current to the first circuit; and
   a voltage line providing a first voltage signal related to a DC bus voltage to the first circuit;
   said first circuit including a command current magnitude signal generator producing the command current signal based on the first current signal and a power factor controller producing the power factor signal, the power factor controller including a feed forward circuit for increasing the power factor signal in response to current fluctuations on the current line.

6. The device of claim 5 wherein said feed forward circuit comprises a summer adding a third signal based on said first voltage signal and a fourth signal based on the first current signal.

7. The device of claim 6 wherein said fourth signal comprises the first current signal filtered by a high pass filter.

8. The device of claim 5 wherein said first voltage signal represents a difference between the first voltage signal and a reference voltage.

9. The method of claim 8 wherein said reference voltage varies independently of said first current signal.

10. The device of claim 5 wherein said first circuit includes a peak detector for detecting current peaks on said DC bus and said command current magnitude signal is based on the DC load current peaks.

11. A device comprising:
    an active rectifier having control gates controllable to produce an output voltage on a DC bus;
    a gate control circuit for producing gate control signals for controlling the active rectifier control gates;
    a first circuit connected to the gate control circuit and producing a command current magnitude signal and a power factor signal for use by the gate control circuit;
    a current line providing a first current signal related to a DC load current to the first circuit;
    a voltage line providing a first voltage signal related to a DC bus voltage to the first circuit;
    said first circuit including a peak detector detecting current peaks on the DC bus, a command current magnitude signal generator commanding a command current as a function of the detected peaks, and a power factor controller varying the power factor signal to control the voltage on the DC bus, the power factor controller including a feed forward circuit for increasing the power factor signal in response to current fluctuations on the current line.

12. The device of claim 11 wherein said feed forward circuit comprises a high pass filter connected to the current line and a summer adding the output of the high pass filter to a third signal related to the first voltage signal.

* * * * *